July 27, 1926.
N. M. LOWER
1,593,584
VACUUM AUTOMOBILE BRAKE
Filed July 5, 1924   5 Sheets-Sheet 2
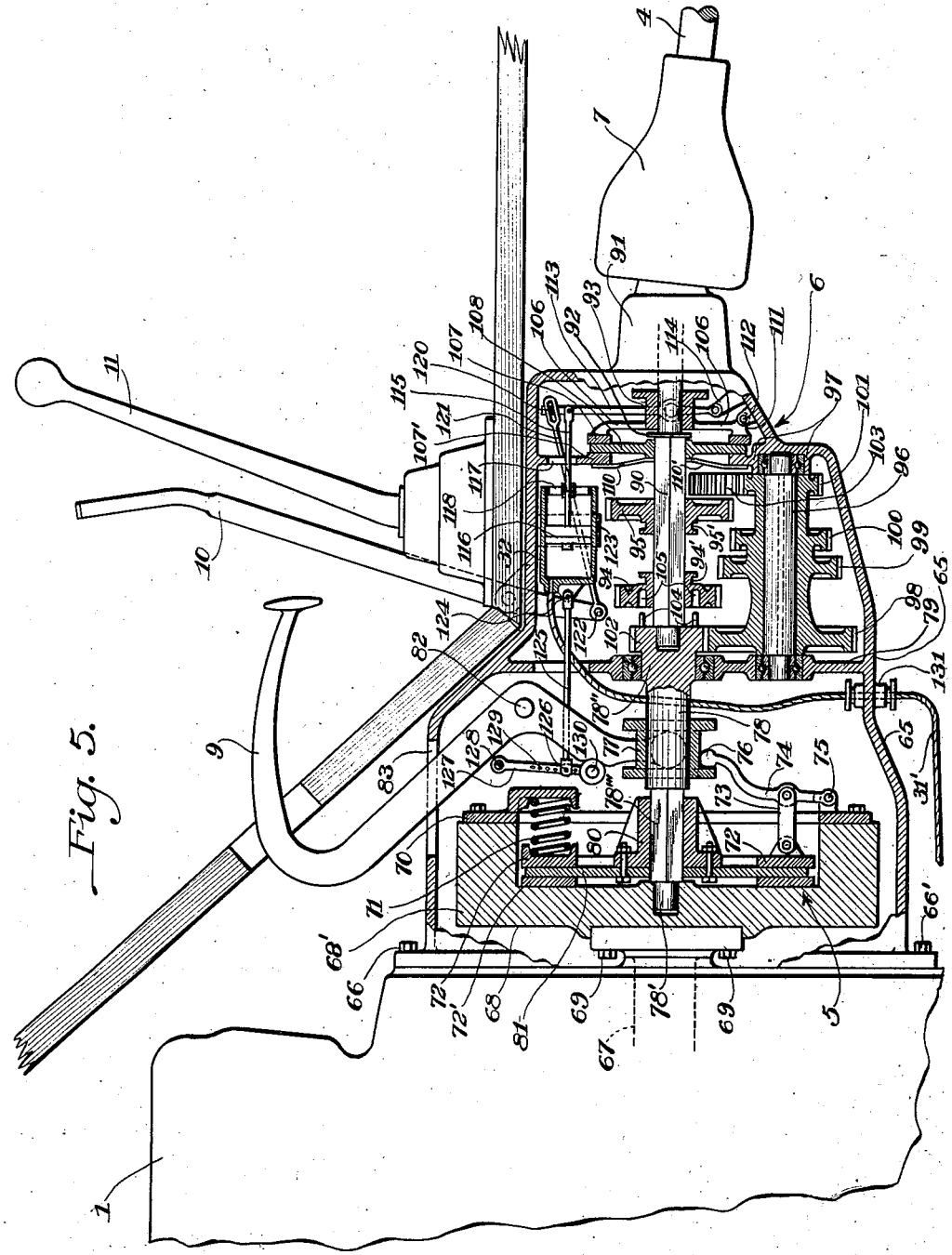

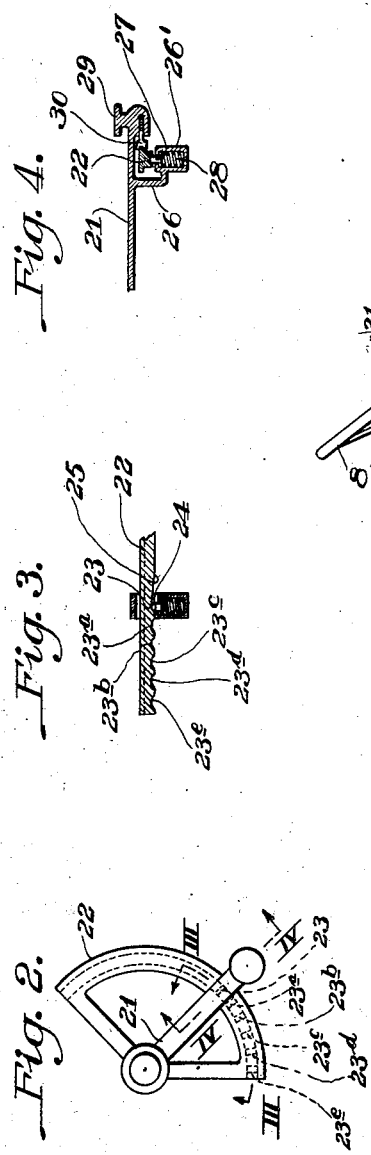

July 27, 1926.

N. M. LOWER

VACUUM AUTOMOBILE BRAKE

Filed July 5, 1924 5 Sheets-Sheet 3

1,593,584

WITNESSES

INVENTOR

July 27, 1926.
N. M. LOWER
1,593,584
VACUUM AUTOMOBILE BRAKE
Filed July 5, 1924 5 Sheets-Sheet 4
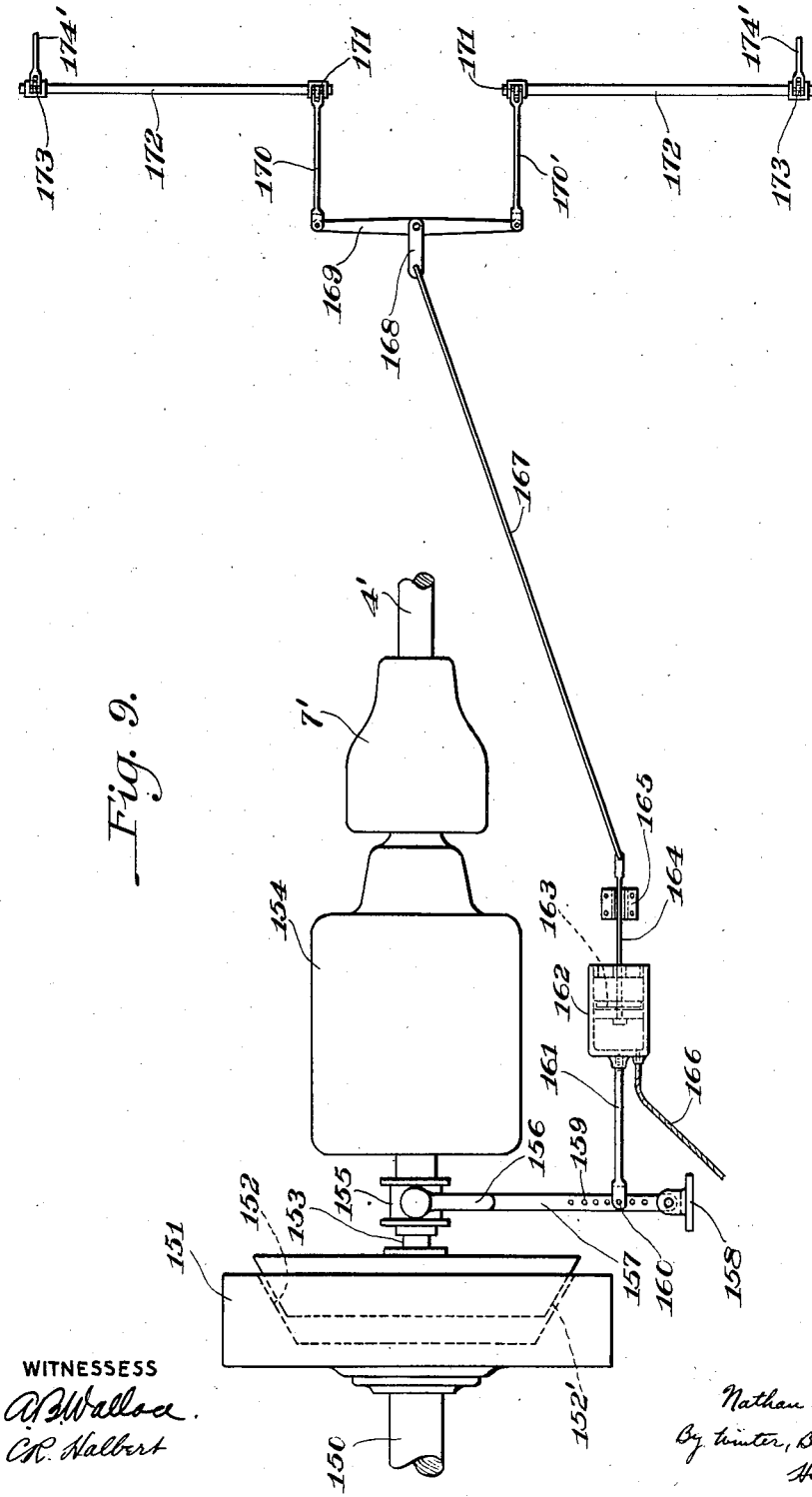

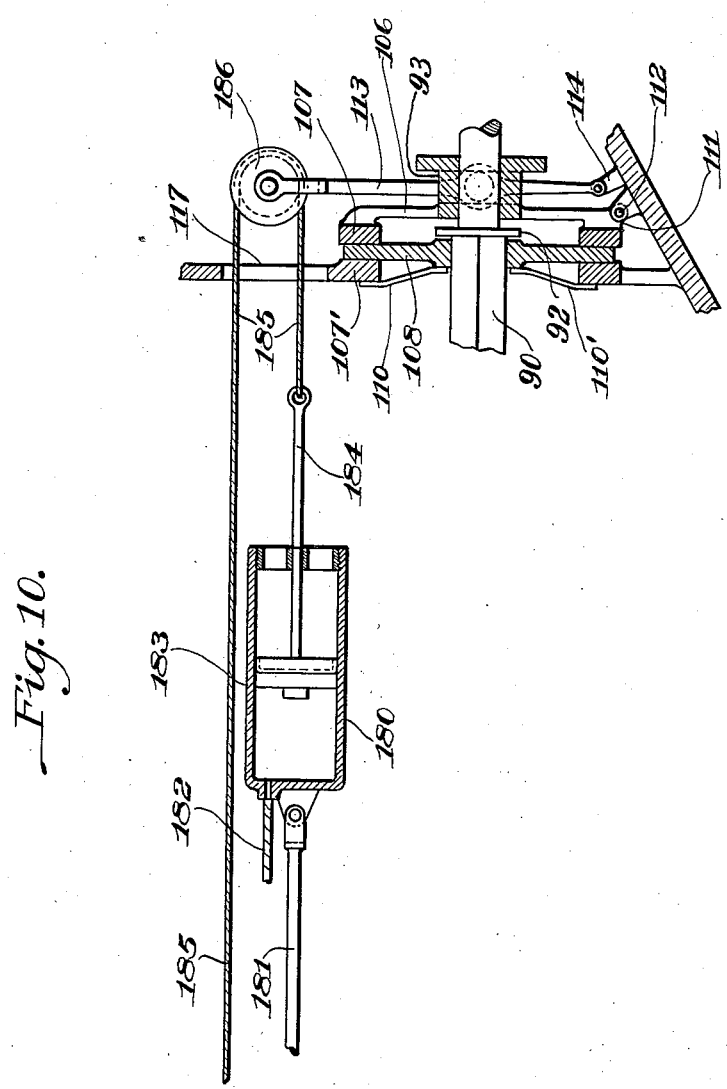

Patented July 27, 1926.

1,593,584

UNITED STATES PATENT OFFICE.

NATHAN M. LOWER, OF BELLEVUE, PENNSYLVANIA.

VACUUM AUTOMOBILE BRAKE.

Application filed July 5, 1924. Serial No. 724,248.

This invention relates to brake systems, and particularly to a vacuum actuated brake system for use on motor vehicles.

It is an object to provide a vacuum brake system which is comparatively simple, compact, semi-automatic and highly efficient in operation.

Special objects of the invention are to provide a vacuum brake system of the character referred to which is actuated by the vacuum maintained in the intake manifold of the internal combustion engine used for propelling the vehicle, which may be controlled by means of the usual gas throttle lever ordinarily found on automobiles, which will automatically function to initially but temporarily apply the brakes and subsequently maintain them applied a predetermined extent, which functions without materially altering the explosive mixture in the intake manifold of the engine due to the leakage of air into the system, and which can be easily and conveniently adjusted to suit varying conditions of operation.

It is also a special object to provide a vacuum brake system which may be controlled from the ordinary hand throttle control lever, and set to maintain different braking effects without disturbing the minimum flow of explosive mixture to the engine during subsequent changes in the setting of the brakes.

It is still a further object to provide a brake system in which the braking elements proper, as well as the brake-actuating cylinder are entirely housed within the transmission gear casing without disturbing the normal functioning thereof, and so associated with the customary clutch and controlling means therefor that the application of the brakes will automatically release the clutch, together with means for conveniently adjusting the cooperating parts to care for changes in conditions of operation.

Additional further objects are to provide a vacuum brake system such as described which may either be attached to automobiles already in use or provided as a part of their initial equipment, and one which after the control element for applying the brakes has been initially set will automatically function to constantly take care of leakage of air into the system.

These and other objects of the invention will more fully appear when taken in conjunction with the following description and the appended claims.

Figure 7:
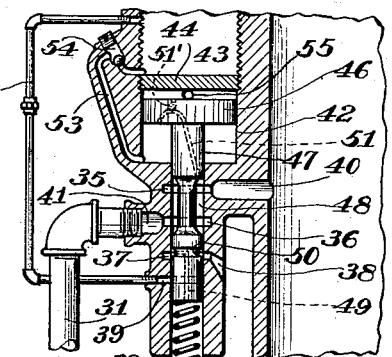
Figure 6:
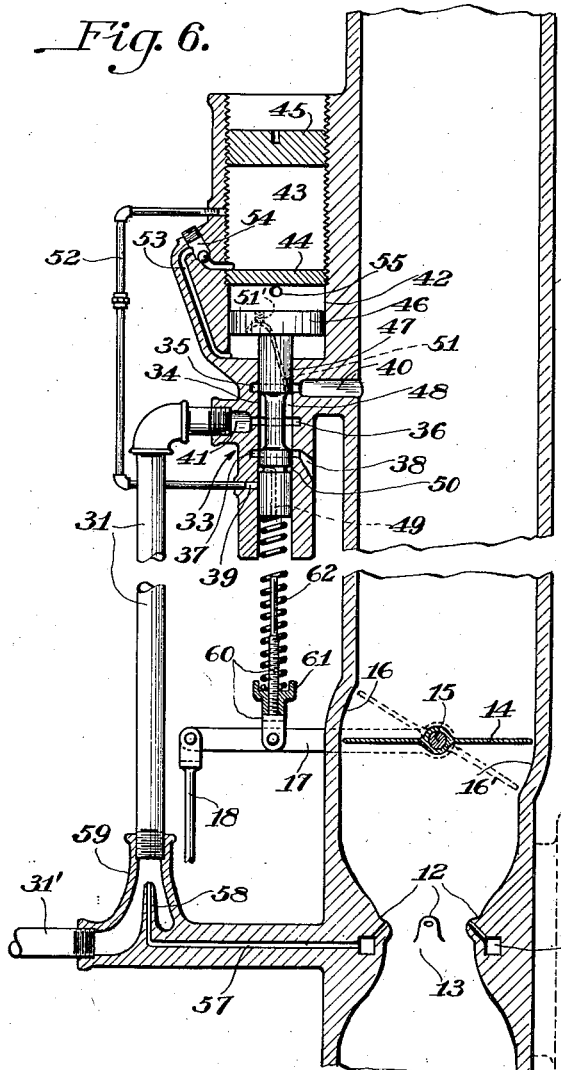
Figure 8:
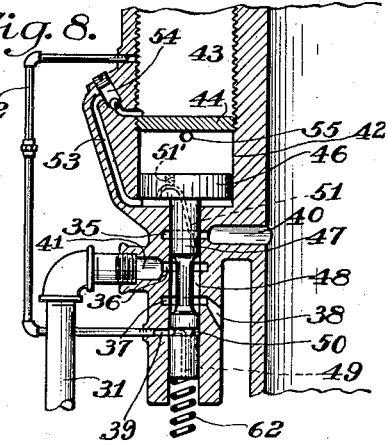

In the accompanying drawings, Fig. 1 is a fragmentary elevational view showing a motor vehicle equipped with the invention; Fig. 2 a fragmentary detail plan view of the hand control lever employed for controlling the ordinary throttle valve of the motor as well as the control valve for the brake system, together with the indicating quadrant used in connection therewith; Fig. 3 a detail sectional view taken substantially on the line III—III of Fig. 2; Fig. 4 a similar view taken substantially on the line IV—IV of Fig. 2; Fig. 5 an enlarged detail view, partly in section and partly in elevation, illustrating the clutch, transmission gear set, and brake mechanism constructed in accordance with the preferred embodiment of the invention; Fig. 6 a fragmentary detail view, partly in section and partly in elevation, showing the intake manifold of the motor, the control valve for the brake system, and the several connections and auxiliary devices forming part of the entire system, the control valve being shown in its mid position; Fig. 7 a fragmentary view of a portion of the parts illustrated in Fig. 6 showing the relative positions which the parts assume when full communication is had between the intake manifold and the brake-actuating cylinder; Fig. 8 a view similar to Fig. 7 illustrating the relative positions which the parts assume when the control valve is in its lowered normal position; Fig. 9 a fragmentary plan view illustrating the method of installing the invention upon vehicles already in use; and Fig. 10 a fragmentary view diagrammatically illustrating the connections employed for actuating the propeller shaft brake and the front wheel auxiliary brakes in unison.

In Fig. 1 of the drawings, there is illustrated a motor vehicle to which the preferred form of the invention has been applied, the usual internal combustion motor being indicated at 1, which is provided with the intake manifold 2 leading from the carbureter 3 to the cylinders of the engine, all in a well known fashion. The motor 1 is adapted to propel the vehicle through means of the propeller shaft 4, and has operatively interposed between it and the propeller shaft the customary clutch 5, the transmission gear set 6 and the universal joint 7, all in accordance with common well known practice. The vehicle is likewise equipped with the customary steering mechanism 8, the clutch pedal 9, the hand control brake lever 10 and the gear shift lever 11.

The intake manifold 2 is supplied with explosive mixture from the carbureter 3 by a series of spray nozzles 12 disposed at the customary reduced portion 13, and mounted within the manifold at a short distance above the nozzles 12 is a rockably supported throttle valve 14, the pivotal axis of which is indicated at 15. The throttle valve is of the well known butterfly type, and has a sufficient space therearound to always permit a small quantity of the explosive mixture to flow past it to the engine. The walls of the intake manifold 2 correspond to usual practice with the exception of the region immediately adjacent the throttle valve. The portions 16, 16' of the walls of the intake manifold, immediately opposite the rock shaft 15 of the throttle valve, as clearly shown in Fig. 6 of the drawings, are of arcuate form, being arranged concentrically with the pivotal axis of the shaft 15, so that after the throttle valve has reached its initial fully closed position, shown in said figure, any additional turning movement of the valve in a clockwise direction, that is, in the direction in which it is ordinarily moved to reduce the flow of explosive mixture to the motor, will not alter the clearance around the valve in spite of said additional movement.

In order to control the position of the throttle valve 14, a lever 17 is fixed to the shaft 15, which in turn is operatively connected by means of the link 18 and the crank arm 19 to the lower end of the rotatable shaft 20 extending upwardly through the steering column, and which has fixed to its upper extremity the customary hand throttle control lever 21, which is positioned at the central portion of the steering wheel. The hand throttle lever 21 lies over an arcuate indicating quadrant 22 fixed to the steering mechanism. The lower surface of the quadrant 22 is equipped with a series of equidistantly spaced notches 23, 23$^a$, 23$^b$, 23$^c$, 23$^d$ and 23$^e$. The notches 23$^a$ to 23$^e$ are of similar form and symmetrically shaped, but the notch 23 at the beginning of the series has a comparatively abrupt side wall 24 adjacent the next succeeding notch 23$^a$, but its opposite side wall 25 but slightly inclined from its deepest part away from the said series of notches. The lever 21 is equipped with a depending lug 26 provided with a spring receiving recess 26' at its extremity in which is slidingly mounted a yielding locking finger 27 which is resiliently forced upwardly into engagement with the notches 23 to 23$^e$ by the coiled spring 28. The outer end of the lever 21 is also equipped with a gripping knob 29 and a spring pressed friction piece 30 which is adapted to yieldingly press against one edge of the quadrant 22.

The operative connections between the throttle control lever 21 and the throttle valve 14 are so related and disposed that when the lever 21 occupies a position intermediate the ends of the quadrant with the locking finger 27 engaged with the notch 23, the throttle valve will be positioned in its initially closed position, as shown in Fig. 6 of the drawings, and due to the asymmetrical formation of the notch 23, the position of the throttle lever may be determined by the touch of the driver since the lever may be easily moved throughout the region of the quadrant above the notch 23, as viewed in Fig. 2, but will immediately meet with a pronounced resistance as soon as the spring pressed finger 27 has reached the deepest portion of the notch 23. The gradual inclination of the wall 25 permits the throttle lever to be easily withdrawn from the notch 23 in a direction to open the throttle valve 14, but will be noticeably locked in any of the successive steps determined by the notches 23$^a$ to 23$^e$, if moved in the opposite direction. From the previous description, it will also be obvious that movement of the throttle control throughout the region of the quadrant 22 defined by the end notches 23 and 23$^e$ will not alter the quantity of explosive mixture fed to the engine because of the presence of the curved portion 16, 16' on the inner walls of the intake manifold.

Connected to the intake manifold at a point between the throttle valve 14 and the engine cylinder is a conduit 31, a branch continuation 31' of which leads to a brake actuating cylinder 32, forming a part of the braking mechanism for the vehicle as will be set forth subsequently more in detail. The conduit 31 does not connect directly with the intake manifold 2 but through an interposed control valve casing 33 which may either be attached to the intake manifold in any suitable manner or form an integral part thereof. The control valve casing is provided with a cylindrical bore 34 which is equipped with a series of spaced annular valve ports 35, 36 and 37, as well as the apertures 38 and 39 leading through the walls thereof, the aperture 38 connecting the annular port 37 with the atmosphere. The upper annular port 35 is placed in communication with the interior of the intake manifold by the opening 40, and the conduit 31 is placed in direct communication with the intermediate annular valve port 36 by means of the opening 41.

The upper portion of the control valve casing is somewhat enlarged and provided with a cylindrical bore throughout. The lower portion of this bore constitutes a piston or diaphragm chamber 42 which is separated from the upper portion 43 of the bore which contitutes a volume chamber by means of the imperforate interposed wall 44. In order to facilitate assembly, the said bore may be internally threaded as shown in the drawings and the periphery of the wall 44 correspondingly exteriorly threaded for insertion therein. The extreme upper end of the volume chamber 43 is closed by means of the imperforate threaded plug 45 which may be adjusted so as to vary the cubical contents of the volume chamber, in an obvious fashion.

Slidingly fitting within the chamber 42 is a piston 46, having attached thereto the depending valve stem 47 which slidingly fits within the bore 34. The valve formed by the depending stem 47 is of the piston type, the stem being provided with an annular recessed portion 48 of sufficient length to extend substantially from the upper limits of the annular port 37 to the lower limits of the annular port 35, and to bridge the space between the central annular port 36 and either of the remaining annular ports. The lower extremity of the valve stem is also equipped with a duct 49 which communicates with an annular channel or groove 50 formed around the periphery of the stem. A duct 51 having a small cross sectional area extends from the annular recess 48 upwardly through the valve stem and the piston 46, establishing communication between the annular recess and the space below the piston 46. The effective size of the duct 51 may be varied at will by the small screw 51' which serves as a controlling needle valve for governing flow through the duct. A pipe 52 establishes communication between the aperture 39 and the volume chamber 43. A passageway 53 establishes communication from the volume chamber 43 to the space below the piston 46, and has interposed therein a check valve 54 permitting flow from the volume chamber toward the space below the piston, but preventing reverse flow in the opposite direction. An opening 55 constantly places the space between the wall 44 and the piston 46 in communication with the atmosphere.

The control valve and the parts associated therewith are so proportioned that when the control valve occupies its lowermost position, as indicated in Fig. 8 of the drawings, which is the position normally occupied by the control valve when the brakes are released, the annular groove 50 lies in alignment with the aperture 39, thereby placing the volume chamber 43 in communication with the atmosphere through the pipe 52, aperture 39, groove 50 and the duct 49. In this position, the annular recess 48 also establishes communication between the conduit 31 and the atmosphere through the ports 36, 37 and the aperture 38 thereby establishing atmospheric pressure in that portion of the brake cylinder connected with the branch conduit 31'.

Upon upward movement of the control valve to its mid position shown in Fig. 6, both the volume chamber 43 and the conduit 31 is cut off from the atmosphere and the annular recess 48 moved to a neutral position in which the intermediate port 36 is not connected to either of the annular ports 35 or 37. In this position, however, the conduit 31 is placed in communication through the restricted duct 51 with the space below the piston 46, and in turn through the passageway 53 with the volume chamber 43.

When the control valve has been moved to its extreme upper position, as shown in Fig. 7, free communication is established between the conduit 31 and the interior of the intake manifold 2 through the annular valve port 36, the recess 48 and the openings 40 and 41. It is noted that regardless of the position of the control valve the annular recess 48 and the conduit 31 are always in communication with the space below the piston 46 through the restricted duct 51, and that any fluid trapped within the space below the piston or in the passageway 53 between the check valve 54 and the piston chamber, cannot escape except by being withdrawn through the restricted duct 51.

The liquid fuel from the carbureter reaches the spray nozzles 12 through an annular chamber 56 from which leads a duct 57 to an auxiliary spray nozzle 58 disposed within a fitting 59 through which the conduit 31 and the branch conduit 31' thereof are placed in communication. The auxiliary spray nozzle 58 extends into this fitting and is adapted to discharge motive fuel into the conduit 31 in a direction toward the control valve and the intake manifold.

The hand control throttle lever 21, besides serving as the customary control for the throttle valve 14 in a manner previously described, also serves as a manual control means for varying the positions of the control valve. In order to accomplish this purpose, the lever 17 has pivotally attached thereto a rod 60 on which is threadedly mounted the spring seat 61 against which the lower end of a coiled compression spring 62 is adapted to rest, with its upper extremity in abutting contact with the lower end of the stem of the control valve. The spring 62 therefore serves as a yielding resilient support for the control valve, and the several parts are so proportioned that ordinarily when the throttle valve 14 is positioned as shown in Fig. 6 of the drawings, the control valve will be held in its mid position.

Preferably, a single housing 65 is provided for both the clutch mechanism and the transmission gear set, and as shown in the drawings, (Fig. 5) may be connected to the engine housing by means of bolts indicated at 66, 66'.

The preferred connections between the main driving shaft 67 of the engine and the propeller shaft 4 will now be described. A fly wheel 68 is attached to the driving shaft 67 in any desirable manner, one means of connection being indicated at 69. The fly wheel 68 is provided with an enlarged rim portion 68' to the rear face of which is bolted the inwardly extending ring 70, this ring serving as a seat for one end of a series of coiled springs 71 adapted to abut at their opposite ends against an annular clutch member 72, spaced opposite a second clutch annulus 72' rigidly attached to the fly wheel 68 within the space defined by the enlarged rim portion 69. The clutch annulus 72 is supported by means of a number of links such as indicated at 73 which have their opposite ends pivotally attached to the annulus 72 and a lever 74 having one end pivoted to the ring 70, as at 75, and its opposite end 76 engaging the annular peripheral groove in a clutch collar 77 mounted upon the shaft 78. One end 78' of the shaft 78 is rotatably journaled within a bore provided in the fly wheel 68 while its opposite end 78'' is rotatably journaled in a bearing located in a web 79 extending across the interior of the housing 65. The intermediate portion 78''' of the shaft 78 is polygonal in cross section and has slidably mounted thereon a collar 80 to which is anchored a circular disc 81 the peripheral portion of which is interposed between the clutch annuli 72 and 72'.

The clutch collar 77 is slidably mounted upon a circular portion of the shaft 78 located between the polygonal portion 78''' and its extremity 78''. The collar 77 is adapted to be slidably moved upon the shaft by means of the customary clutch pedal 9, the lower extremity of which operatively engages the collar for this purpose, the clutch pedal being conveniently mounted for pivotal movement above any convenient point within the housing 65 as indicated at 82, projects through an opening 83 at the upper portion of the housing.

The transmission gear set is also housed within the housing 65 and is located at the rear of the web 79. The main transmission shaft is indicated at 90 and is rotatably journaled within an axial bore provided in the extremity 78'' of the shaft 78, and at its opposite end in a rearwardly projecting boss 91 formed on the housing, this shaft being operatively connected through the universal connection 7 to the propeller shaft 4 in a conventional manner. The shaft 90 is provided with an annular stop flange 92 adjacent its rear portion which is circular in cross section, and upon which is slidably mounted the bodily movable sleeve 93. The portion of the shaft 90 between the annular flange 92 and the forward portion thereof rotatably journaled in the shaft 78 is squared and has slidingly mounted thereon the customary transmission gears 94 and 95, both of which are equipped with the annular recessed portions 94' and 95' adapted to be engaged by a shifting yoke member connected to the lower end of the gear shift lever 11. Since this connection forms no part of the present invention, and conforms to a well known conventional construction, the same has not been illustrated in the drawings for the purpose of eliminating unnecessary parts therein for the sake of clearness. The auxiliary transmission shaft is indicated at 96 and is rotatably journaled at its opposite ends in a bearing provided in the web 79 and in a bearing boss 97 extending inwardly from the housing 65. The auxiliary transmission shaft 96 carries a series of gears indicated at 98, 99, 100 and 101, gear 98 meshing with a gear 102, formed upon the periphery of the enlarged terminal of the extremity 78', and the gear 101 meshing with an idler gear 103 mounted upon an additional auxiliary shaft (not shown), the idler gear being adapted to mesh with the gear 95 when moved to the right, as viewed in Fig. 5 of the drawings.

The rear face of the gear 102 is equipped with a plurality of projecting fingers 104 which are adapted to mesh with correspondingly shaped depressions 105 formed in the adjacent face of the gear 94.

When the gear 94 is moved toward the left so as to engage the fingers 104 with the depressions 105, power is transmitted directly from the shaft 78 to the main transmission shaft 90 and in turn to the propeller shaft 4. Should gear 94 be shifted toward the right to bring it into mesh with gear 99, the drive from the shaft 78 to the propeller shaft is accomplished through the gears 102, 98, 99 and 94 to the shaft 90. Likewise should gear 95 be moved to bring it into mesh with gear 100, the drive is effected through gears 102, 98, 100 and 95, while if gear 95 is moved so as to bring it into mesh with the idler gear 103, the drive is effected through the gears 102, 98, 101, 103 and 95, in the last named case the shaft 90 being turned in the same direction as the shaft 78. The ratios between the several gears of the transmission set correspond in general to well known practice and enable various speeds of operation of the vehicle in a forward direction, as well as rotation of the propeller shaft to effect a backward movement of the vehicle. In view of the common practice in the art, the entire operation will be clear from the description given.

Extending radially from the slidable sleeve 93 are a plurality of arms such as indicated at 106, carrying at their extremities an annular braking member 107 which is disposed oppositely to a similar annular braking member 107' carried by a web extending inwardly from the housing 65.

A brake disc 108 is splined for sliding movement upon the squared portion of the shaft 90 adjacent the annular stop flange 92, and has its peripheral portion extending between the braking members 107 and 107'. A plurality of leaf springs 110 and 110' are suitably anchored at one end to the side of the braking member 107 opposite the braking disc 108, and have their inner extremities lying in abutting relation with the hub portion of the said disc, so as to yieldingly urge it toward the annular flange 92 which serves as a limiting stop therefor. One of the radial arms 106 is equipped with a rearwardly projecting lug 111 which is adapted to project within a recess formed in a lug 112 on the interior of the housing, thus permitting bodily sliding but non-rotative movement of the braking member 107.

The sleeve 93 is operatively engaged by a lever 113 pivotally attached at its lower end to an inwardly extending lug 114 and at its opposite end to the extremity of a piston rod 115 attached to the piston 116 slidingly fitting within the floating brake actuating cylinder 32, the piston rod passing through an opening 117 formed in the inwardly extending web carrying the brake member 107' and through the guiding boss 118 disposed at the open end of the brake cylinder 32. The extreme upper end of the lever 113 is also pivotally connected as indicated at 120 by means of a lost-motion connection to a link 121 having its forward end pivotally attached as at 122 to the lower end of the brake lever 10.

The brake actuating cylinder 32 is mounted for floating or free bodily sliding movement within the interior of the housing 65 by means of a supporting strap 123, and has its closed forward end pivotally connected as at 124 to one end of a link 125, extending through an opening in the web 79, and having its forward end pivotally connected as at 126 to a depending lever 127 pivotally suspended from any suitable point 128 within the interior of the housing. The lever 127 is provided with a plurality of apertures 129 whereby to adjust the position of the pivotal connection 126, and is equipped at its lower extremity with an antifriction roller 130 which is adapted to contact the portion of the clutch lever between its pivotal support 82 and the clutch actuating collar 77, as clearly shown in Fig. 5 of the drawings.

As previously noted, the conduit 31 is operatively connected to the brake cylinder 32 by means of the continuing branch conduit 31' which communicates with the space at the interior of the brake actuating cylinder between its closed end and the piston 116. As shown in the drawings, the branch conduit 31' is of the flexible type, and may be led through the housing 65 to the brake actuating cylinder at any desirable point, the opening in the housing through which the branch conduit passes being suitably packed, if necessary as indicated at 131, to prevent the escape of lubricant contained within the housing.

The perferred embodiment of the invention has been described above, and motor vehicles initially equipped with the invention may be provided with the several parts constructed as set forth. However, it may be desirable in numerous cases to equip vehicles already in use with the improved braking mechanism, in which instance the installation may be made in accordance with the showing in Fig. 9 of the drawings.

In Fig. 9, the rear portion of the driving shaft of the motor is indicated at 150 having the fly wheel 151 attached thereto, the centrally recessed portion 152 forming one portion of a cone clutch, the remaining portion of which is indicated at 152' attached to the shaft 153 leading into the transmission gear set 154. The connections rearwardly to the propeller shaft correspond generally to those previously described, the universal connection being indicated at 7', and the propeller shaft at 4', respectively. The clutch collar in this form is indicated at 155 and is operatively engaged by the forked upper end 156 of a lever 157 pivotally anchored at any convenient point as shown at 158. The lever 157 is provided with a series of spaced apertures 159 adapted to serve as pivotal connections for one end 160 of a rod 161 carrying at its opposite end the bodily movable or floating brake cylinder 162.

The brake actuating cylinder 162 corresponds in construction to that described in connection with the preferred embodiment of the invention is equipped with the piston 163 having the rod 164 slidably supported by means of the guide strap 165, and is connected through its closed end by means of the conduit 166 to the control valve and which corresponds in all respects to the branch conduit 31' of the preferred embodiment.

The rear extremity of the rod 164 is connected through any suitable operative connection such as indicated at 167 with the link 168 on the equalizing lever 169 of a well known type of brake actuating mechanism. As shown, the extremities of the equalizing lever 169 are connected through the links 170, 170' to the upper ends of the levers 171, 171' to the rock shafts 172 and 172', which in turn are equipped with the levers 173 and 173' pivotally connected through the links 174 and 174', respectively, to the brake band actuating devices associated with the braking surfaces upon the wheels of the vehicle.

In Fig. 10, a still further modified arrangement is illustrated showing the adaptation of the invention for simultaneous actuation of the brake associated with the propeller shaft and in addition auxiliary brakes on the front wheels of the vehicle.

In this figure, the several parts constituting the brake association with the propeller shaft correspond to those shown in the preferred embodiment, and have been designated by the same reference numerals. The brake actuating cylinder is indicated at 180 which is connected to the clutch by the link 181 and is exhausted through the conduit 182 leading to the control valve, as in the previously described forms.

The piston 183 within the brake actuating cylinder is equipped with the rod 184 having attached to its outer end a cable 185 which is twined around a sheave 186 anchored at the upper end of the lever 113 for applying the brake associated with the propeller shaft. The cable 185 extends forward as illustrated in the drawings and is adapted to be attached to the auxiliary brakes employed in connection with the front wheels of the vehicle.

In operation, the driving shaft of the internal combustion motor may be connected or disconnected from the shaft 78 leading to the transmission gear set by actuating the clutch control lever 9, forward movement of the upper end of the clutch lever serving to slide collar 77 rearwardly which through the operative connections afforded by the lever 74 and the link 73 pulls the clutch ring 72 backwardly against the tension of the springs 71, permitting the clutch disc 81 to ride loosely between the clutch rings 72 and 72'. Release of pressure on the clutch lever, permits the springs 71 to force the clutch ring 72 toward the clutch disc 81, thereby frictionally gripping the disc between the clutch rings, in an obvious fashion, and operatively connecting the driving shaft 67 of the engine to the shaft 78.

Power is transmitted from the shaft 78 to the propeller shaft 4 through the transmission gear set in the manner previously described, the necessary gears to effect the desired speed of the vehicle being brought into mesh by the usual gear shift lever 11 and the operative connections associated therewith.

The speed of the motor may be controlled in the ordinary way by properly positioning the throttle control lever 21 upon the portion of the quadrant 22, lying between the notch 23 and the end of the quadrant.

The brake mechanism, as shown in Fig. 5, may be actuated at will, by movement of the brake lever 10. Rearward movement of the brake lever effects a pull through the link 121 and the lost-motion connection 120 to the lever 113, causing a sliding movement of the sleeve 93 upon the transmission gear shaft, and bringing the brake member 107 first into contact with the brake disc 108, and in turn the brake disc into contact with the braking member 107'. Movement of the braking member 107 sufficiently to frictionally grip the disc 108 between the braking members, retards the rotation of the transmission shaft 90 and consequently effects a braking action upon the vehicle. The degree of braking is determined solely by pressure exerted upon the braking member and its associated disc. Due to the lost-motion connection 120, movement of the brake, in manner described, may be effected through the lever 10, irrespective of any action due to the connection of the piston 116 to the lever 113. As soon as pressure is released upon the lever 10, the springs 110 and 110' slide the braking disc 108 rearwardly into engagement with the limiting stop 92, and permits separation of the braking surfaces, in an obvious fashion.

Should it be desired to actuate the brake from the suction created in the intake manifold of the engine, the control throttle lever 21 is moved so as to bring the same within the region defined by the notches 23 to 23$^e$. Movement of the lever 21 beyond the notch 23, moves the lever 17 and the supporting compression spring 62 upwardly beyond the position shown in Fig. 6 of the drawings, consequently raising the control valve upwardly sufficiently to establish communication between the intake manifold of the engine and the conduit 31. The parts are so proportioned that when the valve is in its normal lowered condition shown in Fig. 8, atmospheric pressure will exist in both the space below the piston 46 and the volume chamber 43, and movement of the throttle lever 21 to the first notch 23$^a$ will lift the control valve sufficiently to cut off communication between the said space and volume chamber with the atmosphere, and establish communication between the intake manifold and the conduit 31, the branch conduit 31', and the brake actuating cylinder 32.

Assuming the control valve in its raised position shown in Fig. 7, due to free communication established between the conduit 31 and the intake manifold, a reduced pressure corresponding to that then existing in the intake manifold will be quickly established within the brake actuating cylinder 32, consequently effecting a movement of the piston 116 toward the left, as viewed in Fig. 5 of the drawings, and an application of the brake. Because one end of the cylinder 32 is open, except for the guiding means provided for the piston rod, the piston 116 is moved as noted above in response to the difference between atmospheric pressure at one side thereof and the reduced pressure established at the opposite side thereof. The brake actuating cylinder 32 is slidably mounted for free bodily sliding movement within the supporting yoke 123, that is, the cylinder 32 is a floating element. Consequently, upon the establishment of the reduced pressure within the actuating cylinder, movement of both the cylinder itself as well as its associated piston is effected, the cylinder moving toward the right, as viewed in Fig. 5, upon the establishment of a reduced pressure within the cylinder. Movement of the cylinder, due to its connections through the link 125 to the suspended lever 126 which has an abutting contact with the lower end of the clutch brake lever, causes the clutch collar 77 to be moved rearwardly with a consequent release of the clutch mechanism whenever the brake is applied. By changing the position of the pivotal connection between the link 125 and the lever 126, the relative degrees of movement of the brake actuating cylinder and the clutch pedal may be adjusted to suit varying operating conditions, and to release the clutch either momentarily upon the application of the brake or at any desired point after the brake has been initially moved to its braking position. After the vacuum within the brake actuating cylinder has been broken, and the brake consequently released, the actuating cylinder is restored to its initial position either under the influence of gravity exerted by the depending lever 129, or, if desired, a positioning spring may be employed for this purpose in an obvious fashion. In case it is not desirable to positively release the clutch whenever the brakes are applied, it is apparent that the operative connections between the brake actuating cylinder and the clutch lever may be dispensed with without in any way detracting from the otherwise normal functioning of the brakes.

The establishment of free communication between the intake manifold and the conduit 31 will quickly reduce the pressure within the brake actuating cylinder 32 to that existing in the intake manifold, consequently exerting considerable power to initially apply the brakes, and the resulting braking effect will be exerted as long as the annular recess 48 of the control valve fully bridges the annular valve port 35. The positioning of the annular recess 48 above the port 35, however, also permits the suction in the intake manifold to exhaust the space within the piston chamber 42 below the piston 46, through the restricted duct 51, and due to the fact that communication is established between this space and the volume chamber 43 by means of the passage 53, both the space below the piston 46 and that within the volume chamber will be exhausted due to the suction thus produced through the restricted duct 51. It is here again noted that this entire space, including the volume chamber, when the control valve occupies the initial normal position as shown in Fig. 8 is in communication with the atmosphere and that upward movement of the valve effects a blocking off of the space from the atmosphere by moving the groove 50 above and out of register with the aperture 39. The suction exerted through the restricted duct 51 slowly exhausts both the space below the piston 46 and the volume chamber 43, gradually reducing the pressure existing within this entire space as long as the annular recess 48 overlaps the port 35. The reduction in the pressure below the piston 46, permits the atmospheric pressure existing above the piston to cause the control valve to be lowered against the tension of the spring 62 until the annular space reaches a point below the port 35, at which time the communication between the intake manifold and the conduit is cut off, it being understood that the space above the piston is in constant communication with the atmosphere through the opening 55. The time required for moving the control valve from its raised position in which free communication is established between the intake manifold and the brake mechanism and the time at which such communication is cut off, depends partly upon the size of the duct 51 the rate of flow through which may be governed by adjusting the position of screw 51' and partly upon the volume of the space to be exhausted, and this latter factor may be varied by suitably adjusting the closure plug 45 so as to change the cubical contents of the volume chamber 43.

During the entire time required for the descent of the control valve, as above described, a suction corresponding substantially to that in the intake manifold is maintained in the brake actuating cylinder, and would be indefinitely maintained were it not for leakage of air into the system between the piston in the brake actuating cylinder and the control valve. Such leakage, however, soon raises the pressure existing in the conduit 31 which is always in communication with the space below the piston 46 by means of the restricted duct 51, and consequently this increase of pressure is also established within the said space. As soon as the pressure below the piston 46 is increased due to this leakage, the control valve is raised sufficiently under the tension of the spring 62, which was previously compressed by the descent of the control valve, to again bring the recess 48 into overlapping relation with the annular port 35, and thereby again placing the conduit 31 and the brake actuating cylinder into either partial or free communication with the intake manifold, with a consequent reduction in the pressure in the said conduit and the brake actuating cylinder.

The increase in the pressure within the space below the piston 46 due to leakage of air into the system is not communicated to the volume chamber 43 because of the presence of the check valve 54 which prevents flow through the passage 53 toward the volume chamber. For this reason, after the initial exhaustion of the volume chamber upon first setting the brake mechanism into operation, subsequent establishment of communication with the intake manifold will merely effect a restoration of the reduced pressure below the piston 46 by withdrawing the air which has leaked into the space below the piston, causing the control valve to again cut off communication to the intake manifold as soon as the pressure within the said space has been reduced to that initially required to move the valve to its lowered mid-position. In other words, when the brakes were first applied, it was necessary to exhaust not only the space below the piston 46 but also the volume chamber 43 in order to move the control valve to cut off communication between the conduit 31 and the intake manifold, but in order to effect subsequent similar movement of the valve, it is merely necessary to exhaust the space below the piston 46, and in the passageway 53 in advance of the check valve 54. In this manner, automatic operation of the control valve will be effected to cause an intermittent establishment of communication between the conduit 31 and the intake manifold whereby to maintain a substantially constant pressure within the brake actuating cylinder dependent upon the necessary reduction in pressure below the piston 46 to accomplish the desired movement of the valve. For example, assuming it to be necessary to merely reduce the pressure below the piston 46 to say twelve pounds per square inch, in order to move the control valve to cut off communication with the engine for the existing setting of the supporting spring 62, such communication will be initially cut off until the pressure in the additional space within the volume chamber 43 as well as that below the piston 46 has been reduced to twelve pounds. Thereafter, any leakage into the brake system bringing the pressure within the conduit 31, and consequently the space below the piston 46 above twelve pounds, will cause an upward movement of the control valve to establish communication between the conduit 31 and the intake manifold until the pressure below the piston 46 has been again reduced to twelve pounds, and the control valve will be continually intermittently moved to maintain a pressure of approximately twelve pounds within the brake system.

Because of the necessity of withdrawing fluid from both the space below the piston 46 and from the volume chamber 43 the control valve when first raised is slower in returning to mid or neutral position than during its subsequent rising and falling movements to maintain the reduced pressure in the brake actuating cylinder. The practical effective results produced by this action of the control valve is an initial heavy or strong application of the brakes followed by a release thereof to the desired point upon leakage into the system.

The necessary reduction in pressure below the piston 46 in order to effect the operation of the valve, in the manner described, depends upon the upward pressure exerted upon the valve by means of its yielding resilient support provided by the coiled compression spring 62. The lifting effect will be obviously increased by moving the lever 17 connected to the throttle valve upwardly, which in turn is accomplished by movement of the hand control throttle lever 21 from the notch 23 in a direction to be brought successively below the several notches 23$^a$, 23$^b$, 23$^c$, etc. It is thus seen that by moving the throttle lever 21 so as to be locked at any of the several positions corresponding to the notches provided on the indicating quadrant, the effective vacuum maintained in the brake system may be varied at will, and the farther the control lever is moved away from the notch 23, the greater will be the braking effect of the brakes. In order to adjust the various parts to any particular installation, provision is made for suitably adjusting the tension of the supporting spring 62 by means of the movable spring seat 61 threadedly mounted upon the rod 60 pivotally attached to the lever 17.

It is noted that movement of the throttle control lever 21 throughout the entire region between the notch 23 and the final notch 23$^•$ will merely change the position of the throttle valve from the position shown in full lines in Fig. 6 to that indicated by dotted lines therein, and in no way affects the quantity of explosive mixture fed to the engine from the carbureter.

Any leakage of air into the brake system is thus drawn into the intake manifold through the branch conduit 31' and the conduit 31 so as to maintain the desired suction in the brake mechanism. If this air were permitted to flow directly into the manifold, it would change the character of the explosive mixture reaching the engine, and might be objectionable not only because of the additional air injected but because of the variations in the quantity introduced from time to time. Consequently, the auxiliary spray nozzle 58 is provided to supply sufficient motive fuel to carburize the air passing through the said conduits in its flow toward the control valve. The auxiliary nozzle 58 functions in a manner similar to the spray nozzles 12, and the quantity of motive fuel drawn through the duct 57 and the nozzle 58 will depend entirely upon the flow of the air from the brake system toward the motor, as will be obvious from an inspection of Fig. 6 of the drawings. By properly proportioning the parts, it is apparent that due to the carburizing of the air drawn into the intake manifold from the brake mechanism, leakage will not materially alter the character of the explosive mixture reaching the engine.

Assuming the brakes to be applied, in order to release them, it is merely necessary to move the throttle control lever 21 sufficiently in an anti-clockwise direction, as viewed in Fig. 2, to permit the annular recess 48 to connect the ports 36 and 37, placing the conduit 31 into communication with the atmosphere through the aperture 38, thus establishing atmospheric pressure on both sides of the piston 116. Whenever the throttle lever 21 after being brought from a position to apply the brakes to a position to again effect opening of the throttle valve 14 to produce an increased flow of explosive mixture to the motor, the control valve will be restored to its initial normal inactive position shown in Fig. 8, thereby placing the volume chamber into communication with the atmosphere through the pipe 52, the annular groove 50 and the duct 49.

The setting of the lever 21 upon the quadrant therefore indicates not only the position of the throttle valve but also the setting of the brake mechanism, and the position determined by the first notch 23 of the series is such as to position the throttle valve in its initial fully closed position indicated in Fig. 6 of the drawings. When moving the lever from a position for controlling the throttle valve only to its braking position, the operator can readily detect when the lever is brought into alignment with the notch 23 due to the provision of the abrupt side wall 24, thereby notifying him that any further movement beyond said notch will place the brakes in operation. Movement of the control lever from its locked position with the notch 23 in the opposite direction, however, may be easily effected due to the gradual inclination of the side wall 25.

The operation of the modified form shown in Fig. 9 will be obvious from that set forth in connection with the preferred embodiment of the invention. The brake actuating cylinder 162 is capable of floating or free bodily movement in a manner similar to that of the brake actuating cylinder 32, and the brakes are adapted to be applied or released by changing or braking the vacuum existing in the cylinder 162. Movement of the cylinder will result in disconnecting the elements of the clutch due to the connection between the rod 161 and the pivotal supporting lever 157, in an obvious fashion. Adjustments, providing for changes in operating conditions, may be effected by varying the pivotal connection 160.

Whenever suction is increased within the brake actuating cylinder 162, the piston 163 is moved toward the left as viewed in Fig. 8, exerting a pull upon connection 167, and the remaining operative connections leading to the brake devices in a well known way.

The operation of the embodiment illustrated in Fig. 10 will also be obvious from an inspection of the drawings. Whenever the piston 183 is caused to move towards the left, a pull will be exerted through the cable 185, the sheave 186 and the lever 113 to apply the brake associated with the propeller shaft, and a pull will be simultaneously exerted by the cable 185 to apply the auxiliary brakes used in connection with the front wheels of the vehicle. It is noted that due to the twining of the cable in the manner shown, any degree of reduction in pressure in the cylinder 180 will cause a greater pull upon the lever 113 than upon the cable, consequently applying the brake on the transmission shaft to a greater extent than the auxiliary front wheel brakes.

Although the preferred embodiment of the invention has been illustrated and described in detail, as required by the patent statutes, it is obvious that many changes in construction and association of parts may be made without departing from the spirit of the invention. It is, therefore not intended to limit the invention beyond that particularly pointed out and defined by the appended claims.

I claim:

1. A vacuum brake system comprising means for creating a vacuum, a brake mechanism, a conduit establishing communication between the said means and mechanism, a control valve interposed in said conduit, tension means for resiliently supporting the valve at all times, and means under the influence of the vacuum creating means for moving the said valve against the said tension means.

2. A vacuum brake system comprising means for creating a vacuum, a brake mechanism, a conduit establishing communication between the said means and mechanism, a control valve interposed in said conduit, tension means for resiliently supporting the valve throughout its entire cycle of operation, a movable abutment attached to the stem of said valve, and means for maintaining open communication between one side of said abutment and the said conduit.

3. In combination with a motor vehicle having an internal combustion motor provided with an intake manifold, a throttle valve for governing flow through said manifold, a brake mechanism, a conduit connecting said manifold and brake mechanism, a control valve, means for actuating the said throttle valve, tension means for yieldingly moving the control valve, and operative connections between the actuating means for the throttle valve and the said tension means to influence the condition of said control valve in accordance with the position of the throttle valve.

4. In combination with a motor vehicle having an internal combustion motor provided with an intake manifold, a throttle valve for governing flow through said manifold, a brake mechanism, a conduit connecting said manifold and brake mechanism, a control valve, means for actuating the said throttle valve, and yielding tension means interposed between said actuating means and the control valve.

5. In combination in a motor vehicle provided with an internal combustion motor having an intake manifold, a throttle valve in said manifold, a brake mechanism, a control valve casing having communication with the said manifold, the brake mechanism and the atmosphere, a control valve in the casing for selectively establishing communication between the brake mechanism and either the manifold or the atmosphere, means for actuating the throttle valve, and a yielding tension means interposed between the said actuating means and the control valve.

6. In combination with a source of vacuum, a conduit in which varying degrees of pressure is to be established from time to time connected to the said source, a control valve casing interposed in said conduit and provided with ports connecting with the said source, the said conduit and the atmosphere, respectively, a valve movable in said casing adapted to selectively connect either the two first named or the two last named ports, a diaphragm chamber, a movable diaphragm connected to the valve disposed within the chamber, means for maintaining a predetermined pressure on one side of the diaphragm, means establishing communication between the opposite side of the diaphragm and the said conduit, and means for manually moving the said valve.

7. In combination with a source of vacuum, a conduit in which varying degrees of pressure is to be established from time to time connected to the said source, a control valve casing having a cylindrical bore interposed in said conduit and provided with three sets of valve ports communicating respectively with the said source, the said conduit and the atmosphere, a piston valve provided with an annular recess adapted to selectively bridge the port communicating with the conduit and either of the remaining ports, a piston chamber, a piston connected to the valve stem and slidable in said chamber, the space at one side of the piston being open to the atmosphere, said valve stem being provided with a restricted duct establishing communication between the space at the opposite side of the piston and the said annular recess, and means for manually adjusting the position of the said valve at will.

8. In combination with a source of vacuum, a conduit in which varying degrees of pressure is to be established from time to time connected to the said source, a control valve casing having a cylindrical bore interposed in said conduit and provided with three sets of valve ports communicating respectively with the said source, the said conduit and the atmosphere, a piston valve provided with an annular recess adapted to selectively bridge the port communicating with the conduit and either of the remaining ports, a piston chamber, a piston connected to the valve stem and slidable in said chamber, the space at one side of the piston being open to the atmosphere, said valve stem being provided with a restricted duct establishing communication between the space at the opposite side of the piston and the said annular recess, a closed volume chamber, means permitting flow from the said volume chamber to the said space at the opposite side of the piston but preventing flow in the opposite direction, and means for manually changing the position of the said valve.

9. In combination with a source of vacuum, a conduit is which varying degrees of pressure is to be established from time to time connected to the said source, a control valve casing having a cylindrical bore interposed in said conduit and provided with three sets of valve ports communicating respectively with the said source, the said conduit and the atmosphere, a piston valve provided with an annular recess adapted to selectively bridge the port communicating with the conduit and either of the remaining ports, a piston chamber, a piston connected to the valve stem and slidable in said chamber, the space at one side of the piston being open to the atmosphere, said valve stem being provided with a restricted duct establishing communication between the space at the opposite side of the piston and the said annular recess, a closed volume chamber, means for establishing communication between said volume chamber and the space at the side of the piston with which the said restricted duct connects, means permitting flow through said last named means in but one direction, and manual means for bodily moving the said valve at will.

10. In combination with a source of vacuum, a conduit in which varying degrees of pressure is to be established from time to time connected to the said source, a control valve casing having a cylindrical bore interposed in said conduit and provided with three sets of valve ports communicating respectively with the said source, the said conduit and the atmosphere, a piston valve provided with an annular recess adapted to selectively bridge the port communicating with the conduit and either of the remaining ports, a piston chamber, a piston connected to the valve stem and slidable in said chamber, the space at one side of the piston being open to the atmosphere, said valve stem being provided with a restricted duct establishing communication between the space at the opposite side of the piston and the said annular recess, a closed volume chamber, adjustable means for changing the size of said volume chamber, means for permitting flow from the said volume chamber to the space at the side of the piston from which the said restricted duct leads but preventing reverse flow therethrough, and means for placing the said volume chamber in communication with the atmosphere when the said valve is in position to bridge its remaining ports to open the conduit to the atmosphere, and resilient yielding means for manually moving the said valve.

11. In combination with an internal combustion motor, having an intake manifold supplied with fuel by a carbureter, a conduit connected to the manifold and leading to mechanism adapted to be actuated by the reduced pressure in the manifold, and means responsive to the flow of fluid through the said conduit toward the manifold for injecting motive fuel into the conduit.

12. In combination with an internal combustion motor, having an intake manifold supplied with fuel by a carbureter, a conduit connected to the manifold and leading to mechanism adapted to be actuated by the reduced pressure in the manifold, and an auxiliary nozzle for injecting motor fuel into said conduit.

13. In combination with an internal combustion motor, having an intake manifold supplied with fuel by a carbureter, a conduit connected to the manifold and leading to mechanism adapted to be actuated by the reduced pressure in the manifold, a fuel-spray nozzle projecting into the said conduit towards the manifold, and means connecting the said nozzle with the fuel supply of the carbureter.

14. In combination in a motor vehicle provided with an internal combustion engine having an intake manifold, a clutch for connecting and disconnecting the engine from the driving wheels of the vehicle, a brake for the vehicle, a floating brake actuating cylinder, a piston in said cylinder operatively connected to the said brake, operative connections between the said cylinder and clutch for disengaging the clutch upon movement of said cylinder, a conduit establishing communication between the said cylinder and manifold, a control valve interposed in the said conduit, and means for actuating the said control valve.

15. In combination in a motor vehicle having an internal combustion engine, a clutch for connecting and disconnecting the engine from the driving wheels of the vehicle, a clutch lever for actuating the clutch, a brake for the vehicle, a brake actuating cylinder mounted for bodily sliding movement, a piston in said cylinder, operative connections between the piston and the brake, means establishing communication between the interior of the cylinder and the intake of the engine to produce a vacuum within the cylinder, means for controlling the communication established by the last named means, and operative connections between the said cylinder and the clutch lever to move the said lever to disengage the clutch upon movement of the brake actuating cylinder.

16. In combination in a motor vehicle having an internal combustion engine, a clutch for connecting and disconnecting the engine from the driving wheels of the vehicle, a brake for the vehicle, a brake actuating means, operative connections between the said means and the brake, means establishing communication between the actuating means and the intake of the engine to operate the actuating means, means for controlling the communication established by the last named means, and a link having its opposite ends connected respectively to the said brake actuating means and the clutch whereby to disengage the clutch in response to movement of said brake actuating means.

17. In combination in a motor vehicle having an internal combustion engine, a clutch for connecting and disconnecting the engine from the driving wheels of the vehicle, a clutch lever for actuating the clutch, a brake for the vehicle, a floating brake actuating cylinder mounted for bodily sliding movement, a piston in said cylinder, operative connections between the piston and the brake, means establishing communication between the interior of the cylinder and the intake of the engine to produce a vacuum within the cylinder, means for controlling the communication established by the last named means, a suspended lever adapted to contact the said clutch lever, a link having its opposite ends connected respectively to the said suspended lever and the brake actuating cylinder whereby to disengage the clutch when the cylinder is moved in one direction, and means for adjusting the relative degrees of movement of said cylinder and clutch lever.

18. In combination in a motor vehicle having an internal combustion engine, a transmission interposed between the engine and the driving wheels of the vehicle including a main transmission shaft, a housing for the said transmission, a brake operatively associated with the said transmission shaft, a floating brake cylinder mounted for bodily sliding movement within the said housing, a piston in said cylinder, operative connections between said piston and brake, means establishing communication between the interior of the cylinder and the intake of the engine whereby to produce a vacuum within the cylinder, and means for manually governing the said communication.

19. In combination with a motor vehicle provided with a driving engine, a clutch for connecting and disconnecting the engine from the propelling shaft of the vehicle, a transmission gear set operatively interposed between the clutch and driving wheels of the vehicle, an enclosed housing for the clutch and transmission gear seat, a brake operatively associated with the driving shaft of the transmission, a brake actuating cylinder, a piston in said cylinder, operative connections between the piston and brake, both said brake and actuating cylinder being disposed entirely within the housing, a clutch lever projectng within the interior of the housing and operatively connected to the clutch, operative connections between the actuating cylinder and the clutch lever to disengage the clutch upon movement of the cylinder in one direction, and means for varying the pressure within the actuating cylinder.

20. In combination with a transmission gear set, having a main driving shaft, a disc slidably but non-rotatably mounted on said shaft, a stationary braking member at one side of the disc against which the disc is adapted to be moved, means for normally holding the disc out of contact with the stationary braking member, and means for selectively moving the disc into abutting relation with the braking member.

21. In combination with a transmission gear set, having a main driving shaft, a disc slidably but non-rotatably mounted on said shaft, a stationary braking member at one side of the disc against which the disc is adapted to be moved, additional means for yieldingly tending to hold the disc away from said braking member, a movable braking member at the opposite side of the said disc, and means for selectively moving the second named braking member axially of the shaft whereby to frictionally grip the said disc between the said members.

22. In combination with a transmission gear set having a main driving shaft, a disc splined upon the said shaft for bodily sliding but non-rotatable movement with respect to the shaft, a stationary braking annulus disposed at one side of the disc, a spring anchored to the said annulus and engaging the disc to urge the disc away from the annulus and a second annulus disposed at the opposite side of the disc supported on said shaft for sliding but non-rotatable movement, and actuating means operatively connected to the supporting means for the second named annulus for moving the same axially of the shaft toward the stationary annulus, whereby to frictionally grip the disc between said annuli.

23. In combination with a motor vehicle provided with an internal combustion engine having an intake manifold, a pivotally mounted throttle valve in said manifold for controlling the flow of explosive mixture to the engine, a brake mechanism for the vehicle, a conduit establishing communication between the manifold and the brake mechanism whereby to actuate the brake mechanism by the suction produced by the engine, a control valve interposed in said conduit, operative connections between the control valve and the throttle valve to enable simultaneous movement of the said valves, portions of the walls of the intake manifold opposite the pivotal point of the throttle valve being concentric therewith, whereby to permit movement of the throttle valve throughout a predetermined range without varying the flow of the explosive mixture to the engine.

24. In combination with a motor vehicle provided with an internal combustion engine having an intake manifold, a pivotally mounted throttle valve in said manifold for controlling the flow of explosive mixture to the engine, a brake mechanism for the vehicle, a conduit establishing communication between the manifold and the brake mechanism whereby to actuate the brake mechanism by the suction produced by the engine, a control valve interposed in said conduit, a single hand control lever operatively connected to both the said valves, an indicating quadrant disposed adjacent the hand control lever for showing the setting of the said valves, the portions of the walls of the intake manifold opposite the pivotal point of the throttle valve being concentric therewith whereby to permit movement of the throttle valve throughout a predetermined range after reaching fully closed position without varying the flow of the explosive mixture past the throttle valve, the parts being so related that when the throttle valve reaches its initial fully closed position the hand control lever occupies a point intermediate the ends of the quadrant and movement thereof from such intermediate position will effect control of the explosive mixture or control of the brakes dependent upon the direction in which the lever is moved.

25. In combination with a motor vehicle provided with an internal combustion engine having an intake manifold, a pivotally mounted throttle valve in said manifold for controlling the flow of explosive mixture to the engine, a brake mechanism for the vehicle, a conduit establishing communication between the manifold and the brake mechanism whereby to actuate the brake mechanism by the suction produced by the engine, a control valve interposed in said conduit, said control valve normally occupying a position to interrupt communication between the manifold and the brake mechanism, a hand control lever for both the said valves, an operative connection between the hand control lever and the throttle valve, a lost-motion connection between the said operative connections to the throttle valve and the control valve, an indicating quadrant disposed adjacent the hand control lever, the parts being relatively proportioned and disposed so that the hand control valve is positioned intermediate the ends of the indicating quadrant when the throttle valve occupies its initial closed position and the control valve occupies its normal position, movement of the control lever from said intermediate position in one direction opening the throttle valve without changing the condition of the control valve, while movement of said lever in the opposite direction initiates travel of the control valve to open communication through the control valve between the intake manifold and the brake mechanism.

26. In combination with a motor vehicle provided with an internal combustion engine having an intake manifold, a pivotally mounted throttle valve in said manifold for controlling the flow of explosive mixture to the engine, a brake mechanism for the vehicle, a conduit establishing communication between the manifold and the brake mechanism whereby to actuate the brake mechanism by the suction produced by the engine, a control valve interposed in said conduit, said control valve normally occupying a position to interrupt communication between the manifold and the brake mechanism, a hand control lever for both the said valves, an operative connection between the hand control lever and the throttle valve, a lost-motion connection between the said operative connections to the throttle valve and the control valve, an indicating quadrant disposed adjacent the hand control lever, the parts being relatively proportioned and disposed so that the hand control lever is positioned intermediate the ends of the indicating quadrant when the throttle valve occupies its initial closed position and the control valve occupies its normal position, movement of the control lever from said intermediate position in one direction opening the throttle valve without changing the condition of the control valve, while movement of said lever in the opposite direction initiates travel of the control valve to open communication through the control valve between the intake manifold and the brake mechanism, and means for yieldingly holding the control lever in said intermediate position.

27. In combination with a motor vehicle provided with an internal combustion engine having an intake manifold, a pivotally mounted throttle valve in said manifold for controlling the flow of explosive mixture to the engine, a brake mechanism for the vehicle, a conduit establishing communication between the manifold and the brake mechanism whereby to actuate the brake mechanism by the suction produced by the engine, a control valve interposed in said conduit, said control valve normally occupying a position to interrupt communication between the manifold and the brake mechanism, a hand control lever for both the said valves, an operative connection between the hand control lever and the throttle valve, a lost-motion connection between the said operative connections to the throttle valve and the control valve, an indicating quadrant disposed adjacent the hand control lever, the parts being relatively proportioned and disposed so that the hand control lever is positioned intermediate the ends of the indicating quadrant when the throttle valve occupies its initial closed position and the control valve occupies its normal position, movement of the control lever from said intermediate position in one direction opening the throttle valve without changing the condition of the control valve, while movement of said lever in the opposite direction initiates travel of the control valve to open communication through the control valve between the intake manifold and the brake mechanism, said quadrant being provided with a series of spaced notches, the first notch of said series being located opposite the said intermediate position of the control lever, and a yieldingly mounted locking finger carried by the lever adapted to engage the said notches.

28. In combination with a motor vehicle provided with an internal combustion engine having an intake manifold, a pivotally mounted throttle valve in said manifold, for controlling the flow of explosive mixture to the engine, a brake mechanism for the vehicle, a conduit establishing communication between the manifold and the brake mechanism whereby to actuate the brake mechanism by the suction produced by the engine, a control valve interposed in said conduit, said control valve normally occupying a position to interrupt communication between the manifold and the brake mechanism, a hand control lever for both the said valves, an operative connection between the hand control lever and the throttle valve, a lost-motion connection between the said operative connections to the throttle valve and the control valve, an indicating quadrant disposed adjacent the hand control lever, the parts being relatively proportioned and disposed so that the hand control valve is positioned intermediate the ends of the indicating quadrant when the throttle valve occupies its initial closed position and the control valve occupies its normal position, movement of the control lever from said intermediate position in one direction opening the throttle valve without changing the condition of the control valve, while movement of said lever in the opposite direction initiates travel of the control valve to open communication through the control valve between the intake manifold and the brake mechanism, said quadrant being provided with a series of spaced notches, the first notch of said series being located opposite the said intermediate position of the control lever, said first notch having a comparatively abrupt side wall adjacent the succeeding notches while its opposite side wall is but slightly inclined, and a yieldingly mounted locking finger carried by the lever adapted to engage the said notches.

29. In combination with a motor vehicle having an internal combustion motor, brake mechanism adapted to be actuated by the suction in the intake of said motor, a single control valve governing communication between the motor and brake mechanism, manual means for initially moving said control valve to establish free communication between said motor and brake mechanism whereby to subject the brakes temporarily to the full suction then existing in the motor, and means for subsequently automatically readjusting the position of said control valve to intermittently vary the degree of communication between the motor and brake mechanism to maintain a pressure in the brake mechanism lower than that of the motor without disturbing the setting of said first named means.

30. In combination with a motor vehicle having an internal combustion motor, brake mechanism adapted to be actuated by the suction in the intake of said motor, a single control valve governing communication between the motor and brake mechanism, manual means for initially moving said control valve to establish free communication between said motor and brake mechanism whereby to subject the brakes temporarily to the full suction then existing in the motor, and means for subsequently automatically readjusting the position of said control valve to intermittently vary the degree of communication between the motor and brake mechanism in response to changes in the pressure conditions in the brake mechanism to maintain a substantially constant pressure in the brake mechanism lower than that of the motor without disturbing the setting of said first named means.

31. In combination with a motor vehicle having a driving motor, means for controlling the actuation of said motor, brakes for the vehicle, vacuum actuated means for operating the brakes, control means for the last named means, operative connections between the motor controlling means and the brake controlling means, movement of the said motor controlling means effecting variations both in the actuation of said motor and the degree of application of the brakes.

32. In combination with a motor vehicle, brakes for said vehicle, fluid actuated means for operating the brakes, and means for controlling the first named means, said last named means with a predetermined single setting serving to initially apply the brakes to secure a temporary decided braking action and to subsequently maintain a substantially constant braking action less than said temporary decided action.

33. A vacuum brake system comprising a brake, a brake actuating cylinder associated with said brake, a source of vacuum in communication with the said cylinder, and means for maintaining a predetermined pressure in said cylinder, said means initially establishing a lower pressure in said cylinder than that normally maintained thereby.

34. A brake system for automobiles comprising a brake, manual means for applying and releasing said brake, and means for producing a pronounced resistance to continued movement of said manual means when moved in the direction for applying the brake upon reaching the necessary point to cause initial application of the brake whereby to serve as a touch-responsive means to indicate the setting of the brake and without visual inspection.

35. A brake system for automobiles comprising a brake, means for setting said brakes to secure various predetermined braking effects, means for automatically locking the said setting means to selectively maintain the desired predetermined braking effect, said last named means indicating the braking effect for which the first named means is set, said indicating means being touch-responsive whereby the operator can determine the setting thereof by the sense of touch and without visual inspection.

36. In combination with a motor vehicle having an internal combustion engine, brake mechanism for the vehicle, means connecting the intake of said engine with the brake mechanism whereby to actuate the same, and means for carburizing the air leaking into the brake mechanism prior to its reaching the engine.

37. In combination in a motor vehicle having an internal combustion motor, a carbureter for supplying fuel to the motor, a brake mechanism for the vehicle, means governing the fuel supplied to the motor, control means for the brake mechanism, and means for actuating both said first named means in timed relation to each other.

38. In combination with a motor vehicle having a driving motor, means for governing the actuation of the said motor, brake mechanism for the vehicle, and a common controlling means for actuating both the first named means and the brake mechanism in timed relation to each other.

39. In combination in a motor vehicle, having an internal combustion motor, a carbureter for supplying fuel to the motor, a throttle valve governing the supply of fuel from the carbureter to the motor, a brake mechanism for the vehicle, a common control means for said throttle valve and brake mechanism, and means permitting movement of the said throttle valve throughout a predetermined range without varying the quantity of fuel flowing past the said throttle valve.

40. In combination in a motor vehicle having a driving engine, means for governing the operation of the engine, a brake mechanism for the vehicle, a single movable controlling element for actuating both the said governing means and brake mechanism, a fixed indicating quadrant disposed adjacent said movable controlling element, the said quadrant being divided into two separate zones, one of said zones indicating the setting of said actuating means for the engine, and the remaining zone indicating the setting of the brake mechanism.

41. In combination in a motor vehicle having a propeller shaft, means operatively associated with said shaft whereby to retard movement thereof, means for actuating the first named means, and an operative connection leading from said actuating means adapted for attachment to the front wheel brakes of the vehicle.

42. In combination in a motor vehicle having a transmission gear set, a housing for said gear set, a brake disposed within the housing associated with the main propelling shaft of said set, actuating means for said brake, said actuating means including a common connection operatively associated with said brake and adapted to be attached to the auxiliary front wheel brakes of the vehicle.

43. In combination in a motor vehicle having a propeller shaft, a brake associated with said shaft, means for actuating the said brake, an operative connection from said actuating means to said brake, said connection being adapted for attachment to the auxiliary front wheel brakes of the vehicle and so arranged as to produce a greater braking effect upon said propeller shaft brake than upon the said auxiliary brakes.

In testimony whereof, I sign my name.

NATHAN M. LOWER.